3,769,384
SEPARATION OF PHOSPHOROUS AND PHOSPHORIC ACIDS BY ALCOHOLIC COUNTERCURRENT EXTRACTION
William L. Kovacs, Springfield Township, Hamilton County, Phillip F. Pflaumer, Colerain Township, Hamilton County, and David D. Whyte, Springfield Township, Hamilton County, Ohio, assignors to The Procter & Gamble Company, Cincinnati, Ohio
Filed Mar. 1, 1971, Ser. No. 120,026
Int. Cl. B01d 11/04; C01b 25/16
U.S. Cl. 423—316
9 Claims

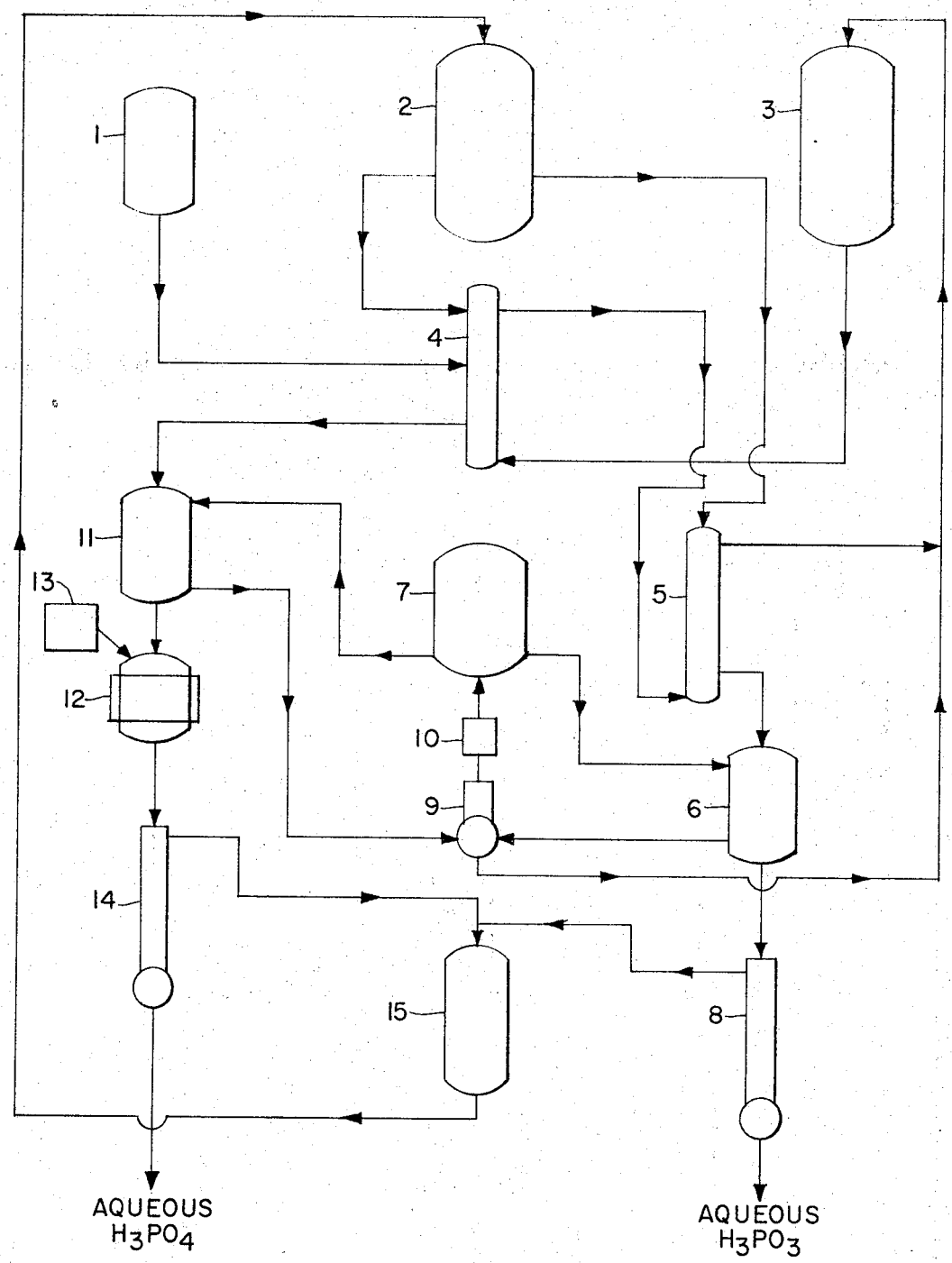
AQUEOUS
H₃PO₄
AQUEOUS
H₃PO₃
*INVENTORS*
William L. Kovacs
Phillip F. Pflaumer
David D. Whyte United States Patent Office 3,769,384
Patented Oct. 30, 1973

ABSTRACT OF THE DISCLOSURE

A process for the separation of phosphorous acid from an aqueous solution of phosphorous and phosphoric acids comprising the contacting of said aqueous solution of the acids with countercurrent streams of water and an aliphatic alcohol in a multi-stage extraction device and recovering an organic phase consisting essentially of phosphorous acid and aliphatic alcohol, and an aqueous phase comprising phosphoric acid and water.

BACKGROUND OF THE INVENTION

This invention relates to the isolation of orthophosphorous acid ($H_3PO_3$) from mixtures of orthophosphorous acid and orthophosphoric acid ($H_3PO_4$). For purposes of simplicity, these two acids will be referred to hereinafter as phosphorous and phosphoric acid respectively or by their chemical formulas. Phosphorous acid is useful as a reducing agent in reactions where a strong but relatively slow acting reducing agent is desirable. It is also useful as a starting material for the production of phosphitic esters such as diethyl phosphite, which is useful as a lubricant additive, antioxidant and solvent.

Heretofore the utilization of phosphorous acid has been somewhat limited by the relatively high cost of this acid. U.S. Pat. 3,532,461, issued Oct. 6, 1970 to David D. Whyte et al. and U.S. Pat. 3,528,772, issued Sept. 15, 1970 to David D. Whyte et al. describe economically advantageous methods for producing phosphorous acid from elemental phosphorus. According to these methods, however, some phosphoric acid is formed concurrently with the phosphorous acid. In order to realize the full economic potential of these methods a convenient means of separating phosphorous acid from phosphoric acid is desirable.

Accordingly, it is the main object of the present invention to provide an improved method for the separation of phosphorous acid from mixtures of phosphorous and phosphoric acids.

BRIEF SUMMARY OF THE INVENTION

This and other objects are achieved by the invention herein which comprises a process for the separation of $H_3PO_3$ from an aqueous solution of $H_3PO_3$ and $H_3PO_4$ by extraction, said process employing the essential limitations as hereinafter described in detail. The term separation, as used herein, is not limited to mean complete separation of $H_3PO_3$ from $H_3PO_4$ but also encompasses separations wherein mixtures are obtained which are richer, respectively, in $H_3PO_3$ or $H_3PO_4$ than the original mixture of these two acids.

Briefly, the process herein essentially takes place in a multi-stage device for contacting immiscible liquids, preferably an extraction column, suitable examples of which are well-known in the chemical art. When using an extraction column, an aqueous solution consisting essentially of $H_3PO_3$, $H_3PO_4$ and water is fed into approximately the middle portion (i.e., center stage) of the column. Within the extraction column, the aqueous solution is contacted by countercurrent streams of water and an aliphatic alcohol. The water stream enters at the top of the extraction column and flows downward through the column, and the aliphatic alcohol stream enters the bottom of the extraction column and flows upward through the column. Operating under the process limitations hereinafter described, the $H_3PO_3$ becomes dissolved in or is extracted by the aliphatic alcohol in the extraction column and exits from the column from the top; this effluent, which consists essentially of said aliphatic alcohol and $H_3PO_3$, is termed herein "organic phase effluent." The aqueous effluent, exiting from the bottom of the extraction column, comprises phosphoric acid and water and additionally some amount of phosphorous acid and aliphatic alcohol, and is termed herein "aqueous phase effluent." The $H_3PO_3$ in the organic phase effluent can then be extracted from said effluent with water to form an aqueous solution of $H_3PO_3$ having a high degree of purity. The aqueous phase effluent can be converted to an essentially pure solution of $H_3PO_4$ by extracting with an aromatic organic solvent such as benzene to remove residual aliphatic alcohol and then treating said aqueous phase effluent with an oxidizing agent to oxidize residual $H_3PO_3$ to $H_3PO_4$.

BRIEF DESCRIPTION OF THE DRAWING

The drawing illustrates, by flow chart, a preferred continuous process for the practice of this invention.

DETAILED DESCRIPTION OF THE INVENTION

The invention herein is a process for separating $H_3PO_3$ from mixtures of $H_3PO_3$ and $H_3PO_4$ comprising the steps of (a) Feeding an aqueous solution of a mixture of $H_3PO_3$ and $H_3PO_4$ into a multi-stage extraction device, preferably into the middle portion of an extraction column, said aqueous solution containing from about 60% to about 80% by weight of $H_3PO_3$ and $H_3PO_4$ and from about 20% to about 40% by weight water and the molar ratio of $H_3PO_3:H_3PO_4$ in said solution being from about 0.1:1 to about 9.5:1;

(b) Contacting said aqueous solution in said extraction device with countercurrent streams of water and an aliphatic alcohol having from about 5 to about 10 carbon atoms, wherein the volumetric ratio of said aliphatic alcohol to the water fed to said extraction device ranges from about 2:1 to about 40:1;

(c) Maintaining a total $H_3PO_3$ and $H_3PO_4$ acid concentration of from about 15% to about 70% by weight of the water in said extraction device while in contact with said countercurrent water and aliphatic alcohol streams in said extraction device; and (d) Recovering the organic phase effluent, which consists essentially of $H_3PO_3$ and said aliphatic alcohol from said extraction device.

The successful extraction obtained herein is entirely unexpected in view of the teachings of the prior art. $H_3PO_3$ is a stronger acid than $H_3PO_4$ and therefore it would be expected that $H_3PO_3$ would remain in the aqueous solution of $H_3PO_3/H_3PO_4$, allowing only the weaker $H_3PO_4$ to be extracted by the countercurrent stream of aliphatic alcohol. Although not wishing to be bound by theory, the separation herein is believed to be due to the different and competing attracting strengths between aliphatic alcohol (ROH) and $H_3PO_3$, ROH and $H_3PO_4$, water and $H_3PO_3$ and water and $H_3PO_4$, as exploited by the process limitations herein. $H_3PO_3$ has two OH sites available for hydrogen bonding with water and $H_3PO_4$ has three. If only a *limited* amount of water is present it will more likely be attracted to the $H_3PO_4$ due to the greater number of hydrogen bonding sites. In the practice of the present invention, using a multi-stage extraction column as the extraction device, as the stream of aliphatic alcohol enters the extraction column and contacts the aqueous solution of $H_3PO_3/H_3PO_4$ fed thereinto, some of the $H_3PO_3$ and $H_3PO_4$ are extracted by and become dissolved in the alcohol. As the extract progressively approaches the column entrance through which the countercurrent water stream enters, the carefully limited water becomes increasingly successful in selectively attracting and extracting out the $H_3PO_4$ from the aliphatic alcohol extract. Thus, as the aliphatic alcohol extract approaches the opening through which the water stream is fed, the weight percent of $H_3PO_4$ in the aliphatic alcohol diminishes. The aliphatic alcohol leaving the column essentially contains only $H_3PO_3$ (although a relatively small proportion of $H_3PO_4$ may also be present) and is called the organic phase effluent; the water leaving the column contains $H_3PO_4$ along with some aliphatic alcohol and $H_3PO_3$ and is the aqueous phase effluent. The amount of water in the countercurrent extraction must be closely controlled in order to take advantage of the differences in hydrogen bonding potential of $H_3PO_3$ and $H_3PO_4$. Too little water will result in no selective extraction of $H_3PO_4$ by water because the OH bonding sites of both $H_3PO_3$ and $H_3PO_4$ will be more strongly attracted to the numerous hydrogen bonding sites in the alcohol stream than to the relatively fewer hydrogen bonding sites in the limited amount of water and the result will be that the alcohol stream will continue to contain a relatively unchanged ratio of $H_3PO_3$ and $H_3PO_4$. On the other hand, too much water will also result in no selective extraction of $H_3PO_3$ by the alcohol. This is because the OH bonding sites of both $H_3PO_3$ and $H_3PO_4$ will be strongly attracted to the preponderant number of hydrogen bonding sites in the water. Thus, the excess of water will tend to keep both the $H_3PO_3$ and $H_3PO_4$ out of the alcohol stream. In accordance with the present invention, when $H_3PO_3$, $H_3PO_4$, water and aliphatic alcohol are present in certain critical proportions, however, separation of $H_3PO_3$ into the alcohol stream and $H_3PO_4$ into the water stream can be obtained.

The mixtures of $H_3PO_3$ and $H_3PO_4$ to be separated by the process of the present invention can come from a variety of sources, e.g., from the oxidation of phosphorus in a moist atmosphere, from the vapor-phase oxidation of phosphorus in the presence of CO and $CO_2$ followed by hydrolysis, as described in U.S. Pat. 3,532,461, issued Oct. 6, 1970 or from the liquid phase oxidation of phosphorus followed by hydrolysis as described in U.S. Pat. 3,528,772, issued Sept. 15, 1970. The mixtures of $H_3PO_3/H_3PO_4$ from these processes normally occur in aqueous solutions. If not in aqueous solutions, they must be put into aqueous solutions to be separated by the process herein. For use in the process herein the aqueous solution of $H_3PO_3$ and $H_3PO_4$ must comprise from about 60% to about 80%, preferably from about 65% to about 75%, by weight of $H_3PO_3$ and $H_3PO_4$ and from about 20% to about 40%, preferably from about 25% to about 35% water. The molar ratio of $H_3PO_3$ to $H_3PO_4$ in the aqueous solution can range from about 0.1:1 to about 9.5:1, preferably from about 1.5:1 to about 9.5:1.

The primary separation of $H_3PO_3$ from $H_3PO_4$ according to the instant invention takes place in a multi-stage extraction device, i.e., a device in which multi-stage contact between immiscible liquids takes place. Various multi-stage extraction devices such as mixer-settler combinations and extraction columns are known in the art and can be used in the practice of the invention (see Perry's Chemical Engineers Handbook, 4th ed., 1963, section 21, pp. 20–35, which is incorporated herein by reference). Generally, devices having from 2 to 200 actual stages can be utilized. In a mixer-settler combination, 2 to 30 stages are preferred and 3 to 20 stages are most preferred. In an extraction column, 5 to 200 stages are preferred and 10 to 150 stages are most preferred. For purposes of simplicity, the invention will be described with particular reference to the use of an extraction column as the multi-stage extraction device, since this is the preferred device. It will be understood, however, that what is said concerning ratios of materials for practicing the invention in an extraction column also applies to practice of the invention when using other types of multi-stage extraction devices.

The above-described aqueous solution of $H_3PO_3$ and $H_3PO_4$ is fed into the middle portion of the extraction column. As used herein, the term "middle portion" refers to the portion of the extraction column within a distance of about 20% of the mid point of the length of the column, as measured from end-to-end. The multi-stage extraction column per se is not a part of this invention, and many examples of columns suitable for use herein are known in the prior art. A suitable extraction column may be described, briefly, as having an opening provided in the middle portion of the column through which the aqueous solution is fed, having two openings near the top of the column (the water stream being fed into the column through one opening, and the organic phase effluent exiting from the column through the other), and having two openings near the bottom of the column (the aliphatic alcohol being fed into the column through one opening, and the aqueous phase effluent exiting from the column through the other). The column is divided into stages by barriers such as baffles or perforated discs which are disposed in the column perpendicular to the main axis of the column. Examples of suitable multi-stage extraction columns are described in Perry's Chemical Engineers Handbook, 4th ed. (1963), section 21, pp. 23–25, which is incorporated herein by reference.

In the extraction column, the aqueous solution of phosphorous and phosphoric acids is contacted with countercurrent streams of water, flowing downwardly through the column, and of an aliphatic alcohol, flowing upwardly through one column.

The aliphatic alcohols employed in the aliphatic alcohol feed stream are saturated aliphatic alcohols having from about 5 to about 10 carbon atoms; the aliphatic alcohol can be a primary, secondary, or tertiary alcohol and can be branched or straight chained. Preferably, the aliphatic alcohol is a straight chained, primary alcohol, e.g., 1-pentanol, 1-hexanol, 1-heptanol, 1-octanol, 1-nonanol, and 1-decanol; 1-hexanol is a particularly preferred aliphatic alcohol for use herein.

The volumetric ratio (e.g., in cubic centimeters) of the aliphatic alcohol fed to the top of the column to the water fed to the bottom of the column can range from about 2:1 to about 40:1, preferably from about 5:1 to about 20:1. This volumetric ratio range is essential to the achievement of selective extraction of $H_3PO_4$ from the aliphatic alcohol and the retention of $H_3PO_3$ in the aliphatic alcohol for the reasons noted hereinbefore. The volumetric ratio of aliphatic alcohol to water is maintained at the prescribed levels by adjustment of the flow rates of the alcohol and water feed streams.

While the aqueous solution of phosphorous and phosphoric acids is in contact with the countercurrent water and aliphatic alcohol streams within the extraction column, it is essential that the concentration of $H_3PO_3$ and $H_3PO_4$ (i.e., the total acid concentration) within the extraction column be maintained within the range of from about 15% to about 70%, preferably from about 30% to about 60%, by weight of the total water (i.e., the water from the water feed stream and from the aqueous solution of $H_3PO_3$ and $H_3PO_4$) in the column at any given time.

When an aqueous solution of phosphorous and phosphoric acids having the aforedescribed limitations and a volumetric ratio of the countercurrent water and aliphatic alcohol streams within the above-disclosed range are employed, a total acid concentration in the extraction column within the range of 15% to 70% by weight can easily be achieved and maintained by properly metering and regulating the flow rates of the three streams entering the column, i.e., the water stream, the aliphatic alcohol stream, and the stream of aqueous solution of phosphorous and phosphoric acids.

The organic phase effluent exiting from the top of the extraction column consists essentially of the aliphatic alcohol and $H_3PO_3$ and can be recovered by any suitable means; e.g., conduits can be used to direct the organic phase effluent into a storage tank or vat. Likewise, the aqueous phase effluent, which contains $H_3PO_4$, along with some $H_3PO_3$ and aliphatic alcohol, and which exits from the bottom of the extraction column, can similarly be recovered.

Thus, as a result of the process described above, an aliphatic alcohol solution enriched in $H_3PO_3$ and an aqueous solution enriched in $H_3PO_4$ are obtained from the starting aqueous mixture of $H_3PO_3$ and $H_3PO_4$.

Each of the individual enriched solutions of $H_3PO_3$ and $H_3PO_4$ which are obtained can be utilized as sources of $H_3PO_3$ and $H_3PO_4$, respectively, for use, e.g., as a reagent in chemical reactions or synthesis. However, it is often desired or required that such reagents be utilized relatively free of impurities other than water; thus, it is preferred that either or both of the individual acids be recovered in relatively pure form before use.

Accordingly, the invention herein additionally comprises a process for recovering $H_3PO_3$ from the organic phase effluent. This recovery can optionally be accomplished by any suitable means known in the art, e.g., by crystallization or distillation.

Preferably, however, the $H_3PO_3$ is recovered from the organic phase effluent by a process comprising the steps of:

(e) Contacting the organic phase effluent in a multistage extraction device, preferably an extraction column, with a volume of water no less than about 75% by volume of the organic phase effluent; and subsequently (f) Contacting the resulting aqueous solution, which consists essentially of $H_3PO_3$ and water and which additionally contains a small amount of the aliphatic alcohol, with an aromatic solvent such as benzene, toluene or xylene in an amount of no less than about twice the weight of said aliphatic alcohol present in the resulting aqueous solution.

The recovery of $H_3PO_3$ from the organic phase effluent essentially involves two steps, as noted above. In the first step, the organic phase effluent is contacted; e.g., in a suitable multi-stage extraction device, preferably an extraction column as previously described, with water; the amount of water employed in this step should be no less than about 75% by volume of the organic phase effluent, said amount of water being essential to obtain the extraction of the $H_3PO_3$ from the aliphatic alcohol of the organic phase effluent by the water. This first step results in an aqueous solution effluent," which consists essentially of water, $H_3PO_3$, and a residual amount of the aliphatic alcohol which is carried over from the organic phase effluent and into the water (a relatively small amount of $H_3PO_4$ may also be present). The amount of aliphatic alcohol carried over is small and generally is that amount of the specific aliphatic alcohol used which is soluble in water; for example, if the aliphatic alcohol used is 1-hexanol, the resulting aqueous solution effluent will generally comprise about 1% by weight of 1-hexanol, this amount generally representing the water-solubility of 1-hexanol at room temperature (about 25° C.).

The removal of this residual aliphatic alcohol is accomplished by the second step of the recovery process, i.e., by contacting (for example, in an extractor), the aqueous solution effluent (resulting from the first step of the recovery process), with an aromatic solvent, the amount of solvent employed being no less than about twice the amount of aliphatic alcohol present in the aqueous solution effluent. Thus, where the aliphatic alcohol used is 1 - hexanol, about 2% by weight aromatic solvent is necessary to remove the 1-hexanol from the aqueous solution effluent. Examples of suitable aromatic solvents are those having the general formula

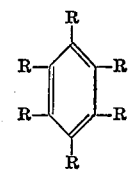

wherein each R is hydrogen or a lower alkyl or alkenyl radical containing from 1 to 3 carbon atoms. Specific examples are benzene, toluene, ortho, meta and para xylene, mesitylene, 1,4-dipropyl benzene, cumene, styrene and 3-phenyl-1-propene. Preferred solvents are benzene, toluene and the xylenes.

After treatment of the aqueous solution effluent with aromatic solvent and removal of the aromatic solvent/aliphatic alcohol, the remaining aqueous solution consists essentially of water and phosphorous acid, although a small amount of phosphoric acid may also be present. If any phosphoric acid is present, it will generally be less than 10% by weight of the total acid.

The essentially pure aqueous solution of $H_3PO_3$ can be utilized as it is (about 5% to 15% by weight acid), or it can first be diluted or it can be concentrated by any suitable technique (e.g., by evaporating off water), to obtain a desired acid concentration.

The invention herein not only provides a process by which the useful commodity phosphorous acid can be obtained, but, additionally provides a process by which the useful commodity phosphoric acid can be obtained.

Accordingly, the aqueous phase effluent, which results from the extraction process described in steps (a)-(d) above and which contains $H_3PO_4$, along with some $H_3PO_3$ and aliphatic alcohol, can be utilized "as is" as a source of $H_3PO_4$, e.g., in chemical reactions or synthesis. Preferably, however, the $H_3PO_4$ in the aqueous phase effluent is purified before use.

Accordingly, the invention herein additionally comprises the purification of $H_3PO_4$ in the aqueous phase effluent by any suitable technique, e.g., by recrystallization or by distillation. Preferably, the $H_3PO_4$ in the aqueous phase effluent is purified by a process which comprises the steps of:

(g) Contacting the aqueous phase effluent with an aromatic solvent in an amount of no less than about twice the weight of aliphatic alcohol present in the aqueous phase effluent; and (h) Contacting the resulting aqueous phase with oxygen at a temperature of at least about 160° C. and at a pressure of at least about 350 pounds per square inch.

In purifying the $H_3PO_4$ in the aqueous phase effluent by the above-noted steps (g)-(h), the aqueous phase effluent is, first, recovered from the extraction column employed in steps (a)-(d); recovery of the aqueous phase effluent can be accomplished by any suitable means, e.g., by means of manifolds, conduits and storage tanks.

The amount of aliphatic alcohol present in the aqueous phase effluent is small and generally is that amount of the specific alcohol used which is soluble in water. This small amount of aliphatic alcohol is removed from the aqueous phase effluent by contacting, e.g., in an extractor, the aqueous phase effluent with aromatic solvent in an amount no less than about twice the weight of aliphatic alcohol present in the aqueous phase effluent. The aromatic solvents described previously as suitable for use in step (f) are also suitable for use in step (g).

After separation of the aromatic solvent/aliphatic alcohol phase, the remaining aqueous phase consists essentially of water, $H_3PO_4$, and $H_3PO_3$. The aqueous phase is then contacted, e.g., in a heated pressure vessel, with oxygen at a temperature of about 160° C. or above, preferably about 160° to about 200° C., and at a guage pressure of about 350 pounds per square inch or above, preferably about 350 to about 450 pounds per square inch, whereby the $H_3PO_3$ in the aqueous phase is converted or oxidized into $H_3PO_4$. The contact of the aqueous phase with oxygen is continued until uptake of oxygen has essentially ceased. The resulting solution is an essentially pure aqueous solution of phosphoric acid which can be utilized as it is or, it can be diluted by adding water or it can be concentrated (e.g., by evaporating off water), to any desired acid concentration.

It will be appreciated that by means of the invention herein, a novel and economical process is provided by which both $H_3PO_3$ and $H_3PO_4$ solutions can be obtained from an aqueous mixture of phosphorous and phosphoric acids, said solutions being usable "as is" as a source of phosphorous and phosphoric acids, or said solutions being capable of purification to provide essentially pure aqueous solutions of $H_3PO_3$ and $H_3PO_4$.

It will further be appreciated that the organic phase effluent and/or the aqueous phase effluent can be concentrated without prior purification.

Moreover, it will be appreciated that the invention herein can be commercially practiced as a batch operation or as a continuous operation. Reference is made to the drawing, wherein a flow-chart representing a preferred continuous process for the practice of the invention herein is illustrated. An aqueous solution of $H_3PO_3$ and $H_3PO_4$, having a total acid concentration of from about 60% to about 80% by weight and wherein the molar ratio of $H_3PO_3$ to $H_3PO_4$ ranges from about 0.1:1 to 9.5:1, is made up and fed into an acid storage tank 1; similarly, water, and an aliphatic alcohol having from about 5 to about 10 carbon atoms are respectively fed into a water storage tank 2 and an alcohol storage tank 3; the aqueous solution of $H_3PO_3$ and $H_3PO_4$, water, and the aliphatic alcohol are then simultaneously fed into the middle portion, the top, and the bottom (respectively) of the primary extraction column 4, in a manner such that the water and the alcohol form countercurrent streams having a volumetric ratio of alcohol to water ranging from about 2:1 to about 40:1, and the total acid concentration, while said aqueous solution of $H_3PO_3$ and $H_3PO_4$ is in contact with said countercurrent water and alcohol streams in said extraction column, ranges from about 15% to about 70% by weight of the water in said extraction column; the resulting organic phase effluent, which consists primarily of $H_3PO_3$ and aliphatic alcohol and which exits from the top of said primary extraction column 4, is then fed into the bottom of the secondary extraction column 5; through the top of said secondary extraction column 5 is fed a volume of water from water storage tank 2 which volume is no less than about 75% by volume of the organic phase effluent in said second extraction column 5, the $H_3PO_3$ in said organic phase effluent contacts said water in said secondary extraction column 5 and is extracted into the water thereby forming an aqueous solution effluent which additionally contains a small amount of aliphatic alcohol and which exits from the bottom of said secondary extraction column 5 and is thereafter fed into an extractor 6 wherein the aqueous solution effluent is contacted with benzene, from benzene storage tank 7, wherein the amount of benzene is at least about twice the weight of said alcohol in said aqueous solution effluent to provide in the aqueous phase an essentially pure aqueous solution of $H_3PO_3$ which can then be fed to a water evaporator 8 to provide a concentrated, essentially pure aqueous solution of phosphorous acid, and which can then be collected and/or fed into a storage tank (not shown); the evaporated water is then fed into a water condenser 15, condensed, and recycled to water storage tank 2; the benzene/alcohol extract from the extractor 6 is fed into a benzene evaporator 9 which evaporates off the benzene and leaves the aliphatic alcohol which is recycled to the alcohol storage tank 3; the evaporated benzene is subsequently liquefied in benzene condenser 10 and recycled to benzene storage tank 7; the aqueous phase effluent from primary extraction column 4, which comprises phosphoric acid, water, phosphorous acid and aliphatic alcohol, exits from the bottom of primary extraction column 4 and is fed into an extractor 11 wherein said aqueous phase effluent is contacted with benzene, from benzene storage tank 7, in an amount of no less than about twice the weight of said aliphatic alcohol present in said aqueous phase effluent; the resulting aqueous phase, after separation from the benzene/alcohol phase in the extractor 11, is then fed into a vessel 12 wherein the aqueous effluent is contacted with oxygen, from oxygen source 13, at a temperature of about 160° C. or above and at a pressure of about 350 pounds per square inch or above until oxygen uptake has ceased; the resulting solution is an essentially pure aqueous solution of $H_3PO_4$ which can then be passed through a water evaporator 14 to obtain a concentrated, essentially pure aqueous solution of phosphoric acid, which can be collected and/or fed into a storage tank (not shown); the evaporated water from water evaporator 14 is then fed into water condenser 15, condensed and recycled to water storage tank 2; the benzene/aliphatic alcohol extract from extractor 11 is fed into a benzene evaporator 9 which evaporates off the benzene and leaves aliphatic alcohol which is recycled to aliphatic alcohol storage tank 3; the evaporated benzene is subsequently liquefied in benzene condenser 10 and recycled to benzene storage tank 7.

Having described the invention herein in detail, the following examples serve to further illustrate embodiments of the invention herein, without limiting said invention.

EXAMPLE I

An aqueous solution of $H_3PO_3$ and $H_3PO_4$, containing about 68% by weight of $H_3PO_3$ and $H_3PO_4$ and having an $H_3PO_3:H_3PO_4$ molar ratio of about 2.8:1 (73.6 mol percent $H_3PO_3$; 26.4 mol percent $H_3PO_4$) was placed into a constant-head reservoir; similarly, distilled water and 1-hexanol (pre-saturated with distilled water) were each placed into constant-head reservoirs. The reservoir containing the aqueous solution of $H_3PO_3$ and $H_3PO_4$ was connected by a conduit to the center of a 72-stage rotating disk extraction column, and the water-containing an alcohol-containing reservoirs were similarly connected to the top and bottom stages, respectively, of the column. By means of needle valves in the conduits from the reservoirs and flow-rate indicators connected to the conduits, the flow rates of the aqueous solution of $H_3PO_3$ and $H_3PO_4$, water and alcohol feed streams into the column were regulated to provide respective flow rates of about 2.8 cc./min., 1.3 cc./min. and 17.7 cc./min.

The extraction column employed was a 9 foot rotating disk column (RDC), having a diameter of about 1 inch and having a plurality of rotatable discs throughout the length of the column. The column had an influent portal at the middle, top and bottom for introducing the streams of agueous $H_3PO_3/H_3PO_4$, water and 1-hexanol, respectively. It also had effluent portals at the top and bottom from which the organic phase and aqueous phase effluents, respectively, were collected. This type of column is described more fully in Perry's Chemical Engineers Handbook—4th ed. (1963), section 21, p. 30.

After filling the column with the water and 1-hexanol feeds the aqueous solution of $H_3PO_3$ and $H_3PO_4$ was fed from its reservoir into the middle stage of the column wherein it was contacted with the countercurrent streams of water and 1-hexanol being fed from their reservoirs into the top and bottom, respectively, of the column. In the column the volumetric ratio of the 1-hexanol to water was maintained at about 6:1 by means of the flow rates described above.

During extraction, the disks in the RDC were rotated at an average speed of about 650 r.p.m. to obtain maximum dispersion of the feed streams in the column. The organic phase effluent exited from the top of the column at about 17.7 ml./min. and the aqueous phase exited from the bottom of the column at about 2.5 ml./min.

After continuous operation was established a 496 ml. sample of the organic phase effluent weighing 574 grams and a 69 ml. sample of the aqueous phase effluent weighing 81 grams were taken over a period of 28 minutes. Each sample was analyzed by $P^{31}$ nuclear magnetic resonance (NMR) to determine the relative proportions of $H_3PO_3$ and $H_3PO_4$ present. The organic phase contained 5.5 wt. percent acid which was 92.5 mol percent $H_3PO_3$. The aqueous phase effluent contained 25 wt. percent acid which was 56.8 mol percent $H_3PO_3$. Thus, 73% of the $H_3PO_3$ was recovered in enriched form in the organic phase.

EXAMPLE II

This example illustrates the recovery of $H_3PO_3$ from the organic effluent phase.

Using a 9 foot rotating disc column as already described, 14 cc./min. water was fed to the top of the column and 18 cc./min. of 1-hexanol saturated with water and containing 14.6 weight percent $H_3PO_3$ and 0.4 weight percent $H_3PO_4$ (97.5 wt. percent $H_3PO_3$ based on total acid) was fed to the bottom of the column. The disc rotation speed was approximately 1020 r.p.m. Organic solution effluent was collected from the top of the column and aqueous solution effluent at the bottom. After steady state operations were established, samples of the organic solution effluent and aqueous solution effluent were collected and titrated with 1.03 N NaOH and found to be delivering .0346 gm. acid/min. and 2.49 gr. acid/min., respectively, corresponding to 98.4% recovery of acid in the aqueous solution effluent. The aqueous solution effluent is then extracted with an amount of benzene which is 2.5 times the weight of 1-hexanol present in the aqueous solution effluent to remove said 1-hexanol from the aqueous solution effluent.

EXAMPLE III

This example illustrates the purification of $H_3PO_4$ obtained from the aqueous effluent phase.

The aqueous effluent phase from the separation of $H_3PO_3$ and $H_3PO_4$ is greatly enriched in $H_3PO_4$ content but still contains a substantial amount of $H_3PO_3$. This stream can be converted to essentially all $H_3PO_4$ by subjecting it to oxidation with $O_2$ at elevated temperature and pressure. 700 milliliters of a solution containing 75 weight percent water and 25 weight percent acids (49 mol percent $H_3PO_3$, 51 mol percent $H_3PO_4$) was placed in a 1 liter stainless steel stirred autoclave and heated to 320° F. Oxygen was added to maintain the pressure at 350 p.s.i.g. After 1 hour the mixture was cooled, removed from the autoclave and analyzed by $P^{31}$ NMR. The product was found to be approximately 93 mole percent $H_3PO_4$ corresponding to 87% conversion of the $H_3PO_3$ fed to $H_3PO_4$.

What is claimed is:
1. A process for separating phosphorous acid from an aqueous solution of phosphorous acid and phosphoric acid comprising the steps of:
    (a) feeding an aqueous solution of phosphorous and phosphoric acids into a multi-stage extraction device, said aqueous solution comprising from about 60% to about 80% by weight phosphorous and phosphoric acids and from about 20% to about 40% by weight water, and wherein the molar ratio of phosphorous acid to phosphoric acid is from about 0.1:1 to about 9.5:1;
    (b) contacting said aqueous solution in said extraction device with countercurrent streams of water and an aliphatic alcohol having from about 5 to about 10 carbon atoms, wherein the volumetric ratio of said aliphatic alcohol to water fed to said extraction device is from about 2:1 to about 40:1;
    (c) maintaining a phosphoric acid and phosphorous acid concentration of from about 15% to about 70% by weight of the water in said extraction device while in contact with said countercurrent water and aliphatic alcohol streams in said extraction device; and
    (d) recovering the organic phase effluent, which consists essentially of phosphorous acid and said aliphatic alcohol, and the aqueous phase effluent, from said extraction device.
2. The process of claim 1 which comprises, after steps (a) through (d), the additional steps of:
    (e) contacting said organic phase effluent with a volume of water no less than about 75% by volume of said organic phase effluent in a multi-stage extraction device; and subsequently
    (f) contacting the resulting aqueous solution effluent with an aromatic solvent in an amount of no less than about twice the weight of said aliphatic alcohol present in said resulting aqueous solution effluent.
3. The process of claim 1 which comprises, after step (d), the additional steps of:
    (g) contacting said aqueous phase effluent with an aromatic solvent in an amount of no less than about twice the weight of said aliphatic alcohol present in said aqueous phase effluent; and
    (h) contacting the resulting aqueous phase with oxygen at a temperature of about 160° C. or above and a pressure of about 350 pounds per square inch or above.
4. The process of claim 1 wherein the multi-stage extraction device is an extraction column and the aqueous solution of step (a) is fed into the middle portion of said column.
5. The process of claim 4 wherein said aqueous solution essentially contains a concentration of phosphorous acid and phosphoric acid ranging from about 65% to 75% by weight and an amount of water ranging from about 25% to about 35% by weight.
6. The process of claim 5 wherein the weight ratio of phosphorous acid to phosphoric acid ranges from about 1.5:1 to about 9.5:1.
7. The process of claim 6 wherein the volumetric ratio of said aliphatic alcohol to said water ranges from about 5:1 to about 20:1.
8. The process of claim 7 wherein the concentration of phosphorous acid and phosphoric acid is maintained within the range of from about 30% to about 60% by weight of the total water in the extraction column while in contact with said countercurrent streams in said extraction column.
9. The process of claim 8 wherein the aliphatic alcohol is 1-hexanol.

(References on following page)

References Cited

UNITED STATES PATENTS

| | | | |
|---|---|---|---|
| 3,361,528 | 1/1968 | Shen | 423—316 |
| 3,363,978 | 1/1968 | De Rooij et al. | 23—312 P |
| 3,437,438 | 4/1969 | Carroll et al. | 423—316 |
| 3,437,439 | 4/1969 | Carroll | 423—316 |
| 3,437,440 | 4/1969 | Carroll | 423—316 |
| 3,540,843 | 11/1970 | Becker | 23—312 P |

FOREIGN PATENTS 672,008  10/1963  Canada.

OTHER REFERENCES

Ebert et al.: "Paper Chromatography of Phosphorus Acids," Chem. Abs., 57:6613(d)—1962.

NORMAN YUDKOFF, Primary Examiner

R. T. FOSTER, Assistant Examiner

U.S. Cl. X.R.

423—321